3,239,527
Patented Mar. 8, 1966

3,239,527
DIAZINES AND A PROCESS FOR THEIR
PREPARATION
Paul Schmidt, Therwil, Kurt Eichenberger, Basel, Alberto Rossi, Oberwil, Basel-Land, and Max Wilhelm, Basel, Switzerland, assignors to Ciba Corporation, New York, N.Y., a corporation of Delaware
No Drawing. Filed Dec. 11, 1962, Ser. No. 243,730
Claims priority, application Switzerland, Dec. 14, 1961, 14,511/61; June 22, 1962, 7,534/62; Sept. 7, 1962, 10,630/62
34 Claims. (Cl. 260—250)

The present invention relates to new 1:4-diazines and a process for the manufacture of 1:4-diazines.

More especially the present invention concerns a new process for the manufacture of 1:4-diazine compounds that contain a mercapto group in the 3-position, a fused ring in the 5:6-position and are unsubstituted in the 2-position or contain in that position a hydroxyl group or an oxo group or an unsubstituted or substituted hydrocarbon group and, if they contain an oxo group in the 2-position, may be substituted in the 1-position by the organic radical of an alcohol, and of their salts.

According to the new process a compound of the formula

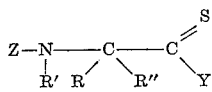

in which Z represents a ring containing in ortho-position a free amino group; R represents a hydrogen atom, a hydroxyl group or an unsubstituted or substituted hydrocarbon group and R′ and R″ together represent a second bond, or R′ represents the organic radical of an alcohol and R and R″ together represent an oxo group, and Y represents an amino group, is cyclised to the diazine in the presence of an acidic or alkaline agent.

In the starting materials to be used in the present process Z represents, for example, an alicyclic group, such as a cycloalkyl (for example cyclopentyl, cyclohexyl or cycloheptyl) group, or an aromatic group, preferably an at most binuclear (such as a naphthyl group, more especially a phenyl) group, or a heterocyclic group which is linked to the nitrogen atom through a cyclic carbon atom which is in vicinal position to a further cyclic carbon atom, being, for example, a pyrimidyl-4 or -5, pyridyl-2 or -3, pyrazolyl-3 or -4 or pyridazyl-3 or -4 group.

The symbol R preferably represents a hydrogen atom or a hydroxyl group. Preferred, unsubstituted or substituted hydrocarbon groups are unsubstituted or substituted lower aliphatic, cycloaliphatic, cycloaliphatic-aliphatic, aromatic or aromatic-aliphatic hydrocarbon groups, such as a corresponding alkyl, alkenyl, cycloalkyl, cycloalkenyl, cycloalkyl-alkyl, cycloalkenyl-alkyl, aryl, aralkyl or aralkenyl group. As substituents for these groups there may be mentioned, for example: for aliphatic groups, hydroxyl, alkoxy, halogen (such as chlorine or bromine), amino, alkylamino or dialkylamino; for cycloaliphatic groups, alkyl, and for aromatic groups, hydroxyl, alkoxy, alkylenedioxy, alkyl, halogen, trifluoromethyl, nitro, amino or dialkylamino. As alkyl groups in the afore-mentioned groups there come into consideration, above all, methyl or ethyl; or straight or branched propyl, butyl, pentyl or hexyl groups which may be bound in any desired position; particularly suitable alkenyl groups are allyl, particularly suitable cycloalkyl groups are cyclopentyl, cyclohexyl or cycloheptyl, particularly suitable cycloalkenyl groups are cyclopentenyl or cyclohexenyl, especially suitable aryl groups are phenyl groups and as aralkyl or aralkenyl groups there may be especially mentioned benzyl, α-phenylethyl, β-phenylethyl or phenylvinyl groups.

The above-mentioned organic radical of an alcohol is, for example, an unsubstituted or substituted hydrocarbon group as described above for R. Alternatively, it may be a heterocyclic radical such as a pyridyl, quinolyl or thienyl group.

The amino group in the thioamide grouping may be unsubstituted, but it is preferably monosubstituted or disubstituted, for example by the unsubstituted or substituted hydrocarbon groups mentioned above for R, more especially by alkyl groups or by alkylene groups whose alkylene chains may be interrupted by hetero atoms, such as oxa-alkylene or azaalkylene groups, for example the butylene-(1:4), pentylene-(1:5), hexylene-(1:5), hexylene-(1:6), heptylene-(2:6), 3-oxa or 3-aza-pentylene-(1:5), 3-methyl-, 3-ethyl- or 3-hydroxy-ethyl-3-aza-pentylene-(1:5), 3-aza-hexylene-(1:6) or 4-methyl-4-aza-heptylene-(2:6) group.

Apart from the amino group the cyclic group Z may contain further substituents. If it is alicyclic, it may contain, for example, alkyl groups, such as those mentioned above. If it is aromatic or heterocyclic, it may contain, for example, the substituents mentioned above as suitable for phenyl groups. For pyrimidyl groups there may be mentioned especially amino, hydroxyl or mercapto groups, so that Z may represent, for example, a 2:6-diaminopyrimidyl-4 group which contains a free amino group in the 5-position.

Preferred starting materials are α-[ortho-aminoanilino]-α-oxoacetic acid thioamides, as well as α-[5-amino-pyrimidyl-4-amino]-α-oxoacetic acid thioamides and α-[4-amino-pyrazolyl-3-amino]-α-oxoacetic acid thioamides, more especially those in which the amino group of the thioamide grouping is tertiary, being, for example, a morpholino, piperidino, pyrrolidino, N-methyl-piperazine or dialkylamino group in which the alkyl groups may be those mentioned above.

The ring closure is performed, for example, in the presence of an acid, more especially a mineral acid, such as a phosphoric acid, hydrochloric or sulfuric acid, or preferably in the presence of a strong base, for example an alkali metal alcoholate such as sodium or potassium ethylate or ammonium acetate, or of an organic amine such as trimethyl-amine or pyridine. It is of advantage to perform the reaction in the presence of an organic solvent, for example ethanol or another alcohol, more especially at an elevated temperature. If desired, the reaction may be preformed under superatmospheric pressure and/or under an inert gas.

The starting materials are known or may be prepared by known methods. According to a particularly favourable method of manufacturing the new starting materials a compound of the formula $$Z'-N(R')-C(R)-CH(R'') \begin{array}{c} X_1 \\ X_2 \end{array}$$

in which $X_1$ and $X_2$ each represents a free, etherified or esterified hydroxyl group, for example an alkoxy or alkanoyloxy group, or a halogen atom, or $X_1$ and $X_2$ together represent an oxo group; Z′ represents a ring which contains in orthoposition a substituent A capable of being converted into a free amino group, for example one of the substituents mentioned below; and R, R′ and R″ have the aforesaid meanings, is subjected to the Kindler reaction, that is to say treated with sulfur in the presence of ammonia or of an amine, and the substituent A is then converted into a free amino group.

The present invention also includes any modification of the present process in which an intermediate obtained at any stage of the process is used as starting material and any remaining step or steps is/are carried out or the process is discontinued at any stage thereof, or in which a starting material is formed under the reaction conditions or is used in the form of a hydrate or salt thereof.

Inter alia, it is of great advantage to use a starting material that contains instead of the ortho-amino group a substituent capable of being converted into a free amino group under acidic or alkaline conditions, and the said substituent is so converted under acidic or alkaline conditions and, without isolating the amino compound, the cyclisation is carried out at the same time.

A substituent convertible into a free amino group under acidic or alkaline conditions is advantageously a group so convertible by acid or alkaline hydrolysis, above all an acylamino group such as an alkanoylamino group eg. a lower alkanoylamino group (for example an acetylamino, propionylamino or butyrlyamino group), or an etherified hydroxycarbonylamino group such as an alkoxycarbonylamino eg. a lower alkoxycarbonylamino (for example the methoxy- or ethoxycarbonylamino) group. These radicals are hydrolysed in a known manner, if desired with heating.

Alternatively, the convertible substituent may be a group that is convertible into the amino group by reduction in an acidic or alkaline medium, such as the nitro, nitroso or an azo group, which, according to the conditions used, is reduced in a known manner, for example, with nascent hydrogen under acidic or alkaline conditions, or catalytically under acidic or alkaline conditions. In this case the ring closure is performed without isolation of the amino compound, as mentioned above.

Some of the aforesaid diazines obtained by the process of the present invention are known; they are valuable intermediates, more especially for the manufacture of medicaments. Compounds of this type are also useful because of their pharmacological properties, more especially because of their diuretic and sodium-secreting properties. They may, therefore, be used pharmacologically for the treatment of animals or correspondingly as medicaments also in veterinary medicine.

Of special value in this respect are the new compounds of the formula

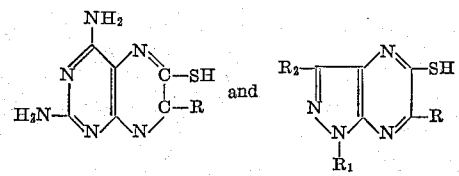

in which R has the meaning given above and $R_1$ and $R_2$ each represents a hydrogen atom or an unsubstituted or substituted hydrocarbon group, for example one of those listed above, and their salts.

Depending on the reaction conditions and starting materials used the final products of the process of the invention are obtained in the free form or in the form of their salts. The salts of the new compounds can be converted in a known manner into the free compounds, for example acid addition salts by treatment with a basic agent. On the other hand, a resulting free base can form salts with inorganic or organic acids. Acid addition salts are preferably prepared with therapeutically useful acids, for example hydrohalic acids, such as hydrochloric or hydrobromic acid, or perchloric, nitric or thiocyanic acid, a sulfuric or phosphoric acid; or with organic acids such as formic, acetic, propionic, glycollic, lactic, pyruvic, oxalic, malonic succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mendelic, salicylic, 4-aminosalicylic, 2-phenoxybenzoic, 2-acetoxybenzoic, embonic, methanesulfonic, ethanesulfonic, hydroxyethanesulfonic, benzenesulfonic, para-toluenesulfonic, naphthalenesulfonic or sulfanilic acid; or methionine, tryptophan, lysine or arginine.

The resulting salts may be monosalts or polysalts. The salts may also be used for purifying the free bases.

The pharmacologically valuable new compounds are intended to be used as medicaments in the form of pharmaceutical preparations which contain the new compounds in admixture or conjunction with solid or liquid, organic or inorganic pharmaceutical excipients suitable for enteral (for example oral) or parenteral administration. Suitable excipients are substances that do not react the new compounds, for example water, gelatine, lactose, starches, magnesium stearate, talcum, vegetable oils, benzyl alcohols, gums, polyalkylene glycols, chloresterol or other known medicinal excipients. The pharmaceutical preparations may be in the form of, for example, tablets, dragees or capsules, or in liquid form solutions, suspensions or emulsions. If desired, they may be sterilized and/or contain assistants, such as preserving, stabilizing, wetting or emulsifying agents, salts for regulating the osmotic pressure, or buffers. They may also contain further therapeutically valuable substances.

The new compounds may also be used in veterinary medicine, for example in one of the forms mentioned above, or in animal husbandry in the form of animal feedstuffs or as additives to animal feedstuffs, being used, for example, together with the conventional extenders or diluents or feedstuffs, respectively.

The following examples illustrate the invention.

*Example 1*

A solution of 2 g. of α-[2-phenyl-4-amino-pyrazolyl-3-amino]-α-oxoacetic acid thiomorpholide in 100 cc. of alcohol and 50 cc. of concentrated hydrochloric acid was heated for 6 hours at the boil and then allowed to cool; the precipitate formed was suctioned off and crystallized from alcohol, to yield 1-phenyl-5-mercapto-6-hydroxy-pyrazolo[3:4-b]pyrazine of the formula

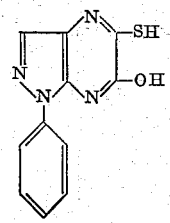

in yellow crystals melting at 249–251° C.

The starting material was prepared in the following manner:

The reaction of 2-phenyl-3-amino-4-para-chloro-phenyl-azo-pyrazole with dichloroacetyl chloride yielded 2-phenyl - 3 - dichloroacetylamino-4-para-chlorophenylazo-pyrazole (melting at 185–186° C.) which, on heating with sulfur and morpholine, yielded α-[2-phenyl-4-parachlorophenyl - azo - pyrazolyl-3-amino]-α-oxoacetic acid thiomorpholide melting at 216–218° C. When this compound was hydrogenated in glacial acetic acid in the presence of a palladium catalyst, it furnished α-[2-phenyl-4-amino-pyrazolyl-3-amino]-α-oxoacetic acid thiomorpholide melting at 163–165° C.

*Example 2*

1.65 g. of α-[2-phenyl-4-amino-pyrazolyl-3-amino]-α-oxoacetic acid thiomorpholide were added to a sodium ethylate solution prepared from 0.25 g. of sodium and 20 cc. of ethanol. The mixture was refluxed for 6 hours, evaporated to dryness under vacuum, taken up in a small amount of water, adjusted with 2 N-hydrochloric acid to a pH value of 1, and the precipitate was suctioned off and recrystallized from alcohol, to yield 1-phenyl-5-mercapto-6-hydroxy-pyrazolo[3:4-b]pyrazine which was identical with the product described in Example 1.

*Example 3*

0.95 g. of α-[ortho-aminoanilino]-α-oxoacetic acid thio-N-methylpiperazide was added to a sodium ethylate solution prepared from 0.7 g. of sodium and 40 cc. of ethanol.

The mixture was refluxed at the boil for 6 hours and then evaporated to dryness under vacuum; the residue was taken up in a small amount of water, adjusted with N-hydrochloric acid to a pH value of 1 to 2, and the precipitate formed was suctioned off and recrystallized from alcohol, to yield 2-hydroxy-3-mercapto-quinoxaline of the formula

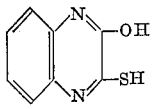

in the form of crystals melting at 306 to 308° C.

What is claimed is:

1. A process for the manufacture of 1:4-diazines, which comprises intramolecularly condensing a cyclic compound, which carries at a ring-carbon atom a thiooxamoylamino group and at a carbon atom adjacent to the carbon atom carrying said thiooxamoylamino group a free amino group, by treatment with a member selected from the group consisting of acidic and alkaline condensing agents.

2. A process as claimed in claim 1, wherein the cyclic portion of said cyclic compound is an alicyclic group.

3. A process as claimed in claim 1, wherein the cyclic portion of said cyclic compound is an aromatic group.

4. A process as claimed in claim 1, wherein the cyclic portion of said cyclic compound is a heterocyclic group which is linked to the nitrogen atom through a cyclic carbon atom which is in vicinal position to a further cyclic carbon atom.

5. A process as claimed in claim 2, wherein the cyclic portion of said cyclic compound is a cycloalkyl group.

6. A process as claimed in claim 3, wherein the cyclic portion of said cyclic compound is an at most binuclear aromatic group.

7. A process as claimed in claim 3, wherein the cyclic portion of said cyclic compound is a phenyl group.

8. A process as claimed in claim 4, wherein the cyclic portion of said cyclic compound is a member selected from the group consisting of a pyrimidyl-4 and a pyrimidyl-5 group.

9. A process as claimed in claim 4, wherein the cyclic portion of said cyclic compound is a member selected from the group consisting of a pyridyl-2 and a pyridyl-3 group.

10. A process as claimed in claim 4, wherein the cyclic portion of said cyclic compound is a member selected from the group consisting of a pyrazolyl-3 and a pyrazolyl-4 group.

11. A process as claimed in claim 4, wherein the cyclic portion of said cyclic compound is a member selected from the group consisting of a pyridazyl-3 and a pyridazyl-4 group.

12. A process as claimed in claim 29, wherein Y is an amino group disubstituted by alkyl groups.

13. A process as claimed in claim 29, wherein the tertiary amino group, Y, is made up of a nitrogen atom disubstituted lower alkylene groups whose alkylene chains may be interrupted by hetero atoms.

14. A process as claimed in claim 1, wherein a member selected from the group consisting of an α-[orthoanilino]- or α-[5-amino-pyrimidyl-(4)-amino]-α-oxoacetic acid thioamide is used as starting material.

15. A process as claimed in claim 29, wherein the tertiary amino group, Y, is a member selected from the group consisting of morpholino, piperdino, pyrrolidino, N-methylpiperazino and dialkylamino in the compound which is used as starting material.

16. A process as claimed in claim 1, wherein the starting material is one which contains, instead of the ortho-amino group, a substituent capable of being converted into a free amino group in the presence of a member selected from the group consisting of an acidic and an alkaline agent, and the said substituent is converted into a free amino group and, without isolating the amino compound, the cyclisation is performed at the same time.

17. A process as claimed in claim 16, wherein the substituent convertible into a free amino group is a group capable of being so converted by hydrolysis in the presence of a member selected from the group consisting of an acid and an alkaline agent.

18. A process as claimed in claim 17 wherein the substituent is an acylamino group.

19. A process as claimed in claim 16, wherein the substituent convertible into a free amino group is a group capable of being so converted by reduction in a medium selected from the group consisting of an acidic and an alkaline medium.

20. A process as claimed in claim 19, wherein the substituent is a member selected from the group consisting of nitro, nitroso and azo.

21. A process as claimed in claim 1, wherein the ring closure is performed in the presence of an acid condensing agent.

22. A process as claimed in claim 1, wherein the ring closure is performed in the presence of an alkaline condensing agent.

23. A process as claimed in claim 22, wherein the ring closure is performed in the presence of a base as the alkaline condensing agent.

24. A process as claimed in claim 23, wherein the ring closure is performed in the presence of an alkali metal alcoholate as the base.

25. A compound of the formula

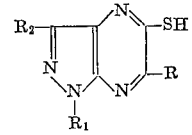

in which R is hydroxyl or an unsubstituted or substituted hydrocarbon group and $R_1$ and $R_2$ each represents a member selected from the group consisting of lower alkyl, phenyl and phenyl-lower alkyl.

26. An acid addition salt of a compound as claimed in claim 25.

27. 1-phenyl-5-mercapto - 6 - hydroxy-pyrazolo[3:4-b]pyrazine.

28. A process for the manufacture of 1:4-diazines, which comprises intramolecularly condensing a cyclic compound, which carries at a ring-carbon atom a thiooxamoylamino group and at a carbon atom adjacent to the carbon atom carrying said thiooxamoylamino group a free amino group, by treatment with a member selected from the group consisting of mineral acids and alkali metal alcoholates.

29. Process as claimed in claim 1, wherein starting materials are used, in which the thiooxamoyl group is a group of the formula

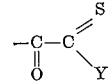

in which Y stands for tertiary amino.

30. Process as claimed in claim 28, wherein starting materials are used in which the thiooxamoyl group is a group of the formula

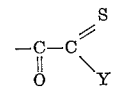

in which Y stands for tertiary amino.

31. Process as claimed in claim 1, wherein starting materials are used in which the thiooxamoylamino group is a group of the formula

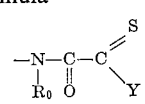

in which $R_0$ stands for a member selected from the group consisting of hydrogen and hydrocarbon and Y for tertiary amino.

32. Process as claimed in claim 28, wherein starting materials are used in which the thiooxamoylamino group is a group of the formula

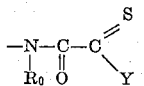

in which $R_0$ stands for a member selected from the group consisting of hydrogen and hydrocarbon and Y for tertiary amino.

33. A process as claimed in claim 1, wherein the amino portion of the thiooxamoylamino group is unsubstituted amino at the thioamide nitrogen atom.

34. A process as claimed in claim 1, wherein the amino portion of the thiooxamoylamino group is mono-substituted amino at the thioamide nitrogen atom.

References Cited by the Examiner

FOREIGN PATENTS 134,692   1/1961   Russia.

IRVING MARCUS, *Primary Examiner.*

HENRY L. JILES, NICHOLAS S. RIZZO, *Examiners.*